(12) United States Patent
Iketani

(10) Patent No.: US 9,026,363 B2
(45) Date of Patent: May 5, 2015

(54) POSITION DETECTION DEVICE, POSITION DETECTION METHOD, AND COMPUTER PROGRAM PRODUCT

(71) Applicant: Kabushiki Kaisha Toshiba, Minato-ku, Tokyo (JP)

(72) Inventor: Naoki Iketani, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 29 days.

(21) Appl. No.: 13/803,960

(22) Filed: Mar. 14, 2013

(65) Prior Publication Data

US 2014/0067262 A1    Mar. 6, 2014

Related U.S. Application Data

(63) Continuation of application No. PCT/JP2012/072756, filed on Sep. 6, 2012.

(51) Int. Cl.
*G01C 21/00* (2006.01)
*G01C 21/16* (2006.01)
*G01C 21/20* (2006.01)
*G01C 22/00* (2006.01)

(52) U.S. Cl.
CPC .............. *G01C 21/00* (2013.01); *G01C 21/165* (2013.01); *G01C 21/206* (2013.01); *G01C 22/006* (2013.01)

(58) Field of Classification Search
USPC ......................................................... 701/518
See application file for complete search history.

(56) References Cited

U.S. PATENT DOCUMENTS

| 4,891,762 | A * | 1/1990 | Chotiros ....................... 701/514 |
| 5,493,294 | A | 2/1996 | Morita |
| 6,016,116 | A * | 1/2000 | Henderson et al. ............. 342/64 |
| 6,499,025 | B1 * | 12/2002 | Horvitz et al. .................. 706/52 |
| 2008/0009965 | A1 * | 1/2008 | Bruemmer et al. ........... 700/245 |
| 2008/0027591 | A1 * | 1/2008 | Lenser et al. ..................... 701/2 |

(Continued)

FOREIGN PATENT DOCUMENTS

JP        05-216407        8/1993

(Continued)

OTHER PUBLICATIONS

International Search Report for PCT/JP2012/072756 mailed on Dec. 11, 2012.
Written Opinion for PCT/JP2012/072756 mailed on Dec. 11, 2012.

*Primary Examiner* — Thomas Tarcza
*Assistant Examiner* — Alex C Dunn
(74) *Attorney, Agent, or Firm* — Amin, Turocy & Watson, LLP

(57) ABSTRACT

According to an embodiment, a position detection device includes a position estimation unit and a position correction unit. The position estimation unit is configured to estimate a position of a moving object based on an absolute position of the moving object and a position change of the moving object obtained from autonomous navigation. The position correction unit is configured to correct, based on presence probability information which is information on each of a plurality of regions and indicates a higher probability as a presence frequency of the moving object is higher, the estimated position of the moving object so that the moving object is present at a position with a high probability.

6 Claims, 13 Drawing Sheets

(56) References Cited

U.S. PATENT DOCUMENTS

2010/0004856 A1* 1/2010 Kobori et al. ............... 701/208
2011/0010089 A1   1/2011 Sambongi
2011/0243379 A1* 10/2011 Miyajima et al. ........... 382/103
2012/0059621 A1*  3/2012 Kotzor et al. ............... 702/150

FOREIGN PATENT DOCUMENTS

| JP | 2008-014742 | 1/2008 |
| JP | 2012-145464 | 8/2008 |
| JP | 2011-017610 | 1/2011 |
| JP | 2012-098137 | 5/2012 |

* cited by examiner

FIG.2

| TIME | ABSOLUTE POSITION | | RELATIVE POSITION | | ESTIMATED POSITION | |
|---|---|---|---|---|---|---|
| | LONGITUDE | LATITUDE | LONGITUDE | LATITUDE | LONGITUDE | LATITUDE |
| 2011/9/9 13:10:00 | 139.696844 | 35.532155 | 139.696844 | 35.532155 | 139.696844 | 35.532155 |
| 2011/9/9 13:10:10 | 139.696728 | 35.532079 | 139.696687 | 35.532130 | 139.696687 | 35.532130 |
| 2011/9/9 13:10:15 | | | 139.696555 | 35.532111 | 139.696555 | 35.532111 |
| 2011/9/9 13:10:20 | | | 139.696412 | 35.532111 | 139.696412 | 35.532111 |
| 2011/9/9 13:10:25 | | | 139.696414 | 35.532185 | 139.696414 | 35.532185 |
| 2011/9/9 13:10:30 | | | 139.696370 | 35.532285 | 139.696370 | 35.532285 |
| 2011/9/9 13:10:35 | | | 139.696488 | 35.532316 | 139.696488 | 35.532316 |
| 2011/9/9 13:10:40 | | | 139.696550 | 35.532394 | 139.696550 | 35.532394 |
| 2011/9/9 13:10:45 | | | 139.696616 | 35.532465 | 139.696616 | 35.532465 |
| 2011/9/9 13:10:50 | 139.696419 | 35.532439 | 139.696647 | 35.532557 | 139.696419 | 35.532439 |

POSITION DETECTION DEVICE, POSITION DETECTION METHOD, AND COMPUTER PROGRAM PRODUCT

CROSS-REFERENCE TO RELATED APPLICATIONS

This application is a continuation of PCT international application Ser. No. PCT/JP2012/072756 filed on Sep. 6, 2012 which designates the United States, incorporated herein by reference.

FIELD

Embodiments described herein relate generally to a position detection device, a position detection method, and a computer program product.

BACKGROUND

In the related art, as technologies for detecting the position of a moving object such as a pedestrian, technologies for using the GPS (Global Positioning System), using a wireless device, and using a position change obtained from autonomous navigation (dead reckoning) have been known. Among these, the technology for using a wireless device is a technology for detecting the position of a pedestrian according to a communication state between a wireless device disposed in an arbitrary place and a terminal device carried by the pedestrian.

In the technology for using the GPS or a wireless device, an absolute position can be detected. However, since there is a problem that a measurement error occurs or the technology may not be used in a place at which a radio wave does not arrive, a position may not continuously be detected with high accuracy. Accordingly, there is a technology for estimating a more exact position by combining an absolute position and a position change calculated from autonomous navigation. Further, in some navigation devices, a technology called a map matching for correcting an estimated position using map information is utilized.

However, in the conventional technologies, there is a problem that it is difficult to specify the position of a pedestrian with high accuracy. Specifically, an absolute position may not continuously be detected with high accuracy in some cases, as described above. Further, since errors are accumulated over time in the autonomous navigation, it is difficult to continuously detect a position with high accuracy only using the autonomous navigation. Further, in regard to the map matching, a huge amount of effort is required to prepare a map indicating places where pedestrians can walk. That is, in a map indicating places where pedestrians can walk, places where pedestrians can walk are present more than places in which vehicles can travel, and it is considered that the places are frequently changed. Therefore, a huge amount of effort is required to make preparations. As a result, in the conventional technologies, the position of a pedestrian may not be specified at low cost, with ease, and with high accuracy.

BRIEF DESCRIPTION OF THE DRAWINGS

FIG. 2 is a diagram illustrating an output result of a position estimation unit;

FIG. 4 is a diagram illustrating target presence probability information;

FIG. 9 is a diagram illustrating presence probability information according to the second embodiment;

FIG. 12 is a diagram illustrating presence probability information according to a third embodiment.

DETAILED DESCRIPTION

According to an embodiment, a position detection device includes a position estimation unit and a position correction unit. The position estimation unit is configured to estimate a position of a moving object based on an absolute position of the moving object and a position change of the moving object obtained from autonomous navigation. The position correction unit is configured to correct, based on presence probability information which is information on each of a plurality of regions and indicates a higher probability as a presence frequency of the moving object is higher, the estimated position of the moving object so that the moving object is present at a position with a high probability.

First Embodiment

Figure 1:
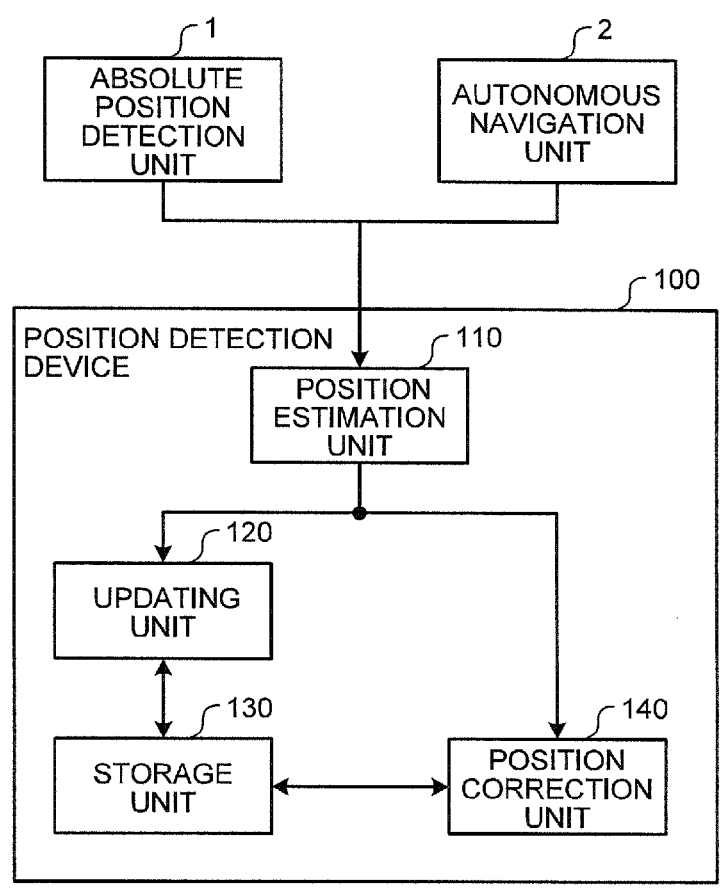
FIG. 1 is a block diagram illustrating a position detection device according to a first embodiment.

FIG. 1 is a block diagram illustrating an example of the configuration of a position detection device according to a first embodiment. As illustrated in FIG. 1, a position detection device 100 includes a position estimation unit 110, an updating unit 120, and a storage unit 130, and a position correction unit 140. The position detection device 100 acquires an absolute position from an absolute position detection unit 1 and acquires a relative position from an autonomous navigation unit 2. For example, the absolute position detection unit 1 and the autonomous navigation unit 2 are included in a terminal device carried by a pedestrian (user) which is a moving object.

The absolute position detection unit 1 detects an absolute position using the GPS. For example, the absolute position detection unit 1 attempts the detection at intervals of 5 seconds, and outputs a longitude "$X_a$" and a latitude "$y_a$" to the position detection device 100 if the absolute position detection unit 1 can detect the absolute position. Further, in the absolute position detection unit 1, not only the detection of the absolute position performed using the GPS but also a plurality of various techniques for detecting an absolute position may be used.

Examples of the other techniques include a technique for detecting the position of a user by identifying a person using a camera and a technique for detecting a position from a communication state between a wireless device and a terminal device. In the technique for detecting a position from a communication state between a wireless device and a terminal device, a position of a wireless communication base station registered in advance from a communication state with a Wi-Fi (registered trademark) or RFID (Radio Frequency IDentification) device is used as a detection result of the absolute position.

In this embodiment, it is not necessary to constantly detect the absolute position, but it is preferable to maintain certain reliability. Thus, only data by which the certain reliability can be maintained may be used based on a DOP (Dilution Of Precision) value which is an index of measurement accuracy. When satellite information may not be obtained from the GPS due to entrance into a building or an underground, the coordinates of a gate of a building or an underground held in advance may be used.

The autonomous navigation unit 2 calculates a relative position change according to autonomous navigation. For example, the autonomous navigation unit 2 detects the number of steps of a pedestrian from an acceleration sensor and detects a travel direction based on a sensor-mounted direction determined in advance, an output from a geomagnetic sensor, and an output from the acceleration sensor. Then, the autonomous navigation unit 2 calculates, using a step size of the pedestrian registered in advance, a relative position change of the pedestrian, which moves in the detected travel direction, by multiplying the detected number of steps by a distance of the step size. Since the relative position change is calculated in the autonomous navigation, an absolute position is acquired once from the outside to calculate the absolute position. In this embodiment, an absolute position is used in the position estimation unit 110 to be described below.

Here, processes performed by the autonomous navigation unit 2 will be described in detail. In a process of detecting the number of steps of a pedestrian, the number of steps is detected from a change in the acceleration sensor. The number of steps is not the total number of steps. The number of steps is detected as a function "stepSignal(t)" of a time that returns "1" when the number of steps increase, and returns "0" in other cases. For example, a sensor value from the acceleration sensor is discretely acquired. When a value of the acceleration sensor at a time "t=t1, t2, t3, ..." is assumed to be "a(t)", "stepSignal(t)" is expressed as in Expression (1) and Expression (2). That is, "stepSignal(t)" is a function that returns "1" when the pedestrian's foot touches the ground during walking. A threshold value "$th_{walk}$" is set to 1.0 (G).

$$s(t) = \begin{cases} 1 & \text{if } a(t) > th_{walk} \\ 0 & \text{otherwise} \end{cases} \quad (1)$$

$$stepSignal(t) = \begin{cases} 1 & \text{if } s(t) - s(t-1) = 1 \\ 0 & \text{otherwise} \end{cases} \quad (2)$$

In the process of detecting the travel direction of a pedestrian, the travel direction of the pedestrian is detected as an absolute azimuth direction. More specifically, an absolute azimuth direction of a terminal device is detected with the geomagnetic sensor, an angle of the travel direction of the pedestrian is obtained from the sensor-mounted direction determined in advance, a gravity vector is obtained from an output of the acceleration sensor, and the travel direction is calculated. For example, it is assumed that "Vf=(xf, yf, zf)" is a travel direction vector in the xyz coordinate system of the terminal device, "Vn=(xn, yn, zn)" is a north direction vector by the geomagnetic sensor, and "Vg=(xg, yg, zg)" is a gravitation direction vector obtained from the acceleration sensor. Then, the angle "direction" indicating the absolute azimuth direction of the travel direction of the pedestrian is calculated by Expression (3) to Expression (6) using an inner product "·" of a vector, an outer product "×" of the vector, and an inverse function "a cos" of a cosine.

$$V_{fh} = V_f - (V_f \cdot V_g) \quad (3)$$

$$V_{nh} = V_n - (V_n \cdot V_g) \quad (4)$$

$$\phi = a\cos\left(\frac{V_{fh} \cdot V_{nh}}{|V_{fh}||V_{nh}|}\right) \quad (5)$$

$$\text{direction}(t) = \begin{cases} \phi & \text{if } (V_f \times V_n) \cdot V_g > 0 \\ -\phi & \text{otherwise} \end{cases} \quad (6)$$

Herein, a gravitation vector "Vg(t)" at a time "t" can be calculated as an average value of an acceleration vector "a(t)" over a given time by Expression (7). Further, "T" is assumed to be 1 second.

$$V_g(t) = \frac{\sum_{\tau=t}^{t-T+1} a(t)}{T} \quad (7)$$

As a result, the travel direction of the pedestrian is continually calculated based on sensor values that are continually output from the various sensors, and thus is detected as a function "direction(t)" of the travel direction for a time at an angle in which the north is set to 0 degrees and the east is set to 90 degrees. A method for not fixing the sensor-mounted direction may be used, but the detailed description will not be made in this embodiment.

A fixed value registered in advance is set as the step size of the pedestrian, as described above. That is, when the fixed value is set to "0.7 (m)", "stepSize(t)=0.7" is satisfied. Here, since the step size is different depending on a person, different step sizes may be registered for every user. Further, the step size may be set to "user's body height−1" which is a value obtained by subtracting a predetermined value such as "1 (m)" from the user's body height registered in advance or may be estimated from the magnitude of an impact of a user's foot touch by acquiring the magnitude of the impact of the touch during walking from the acceleration sensor.

In the process performed by the autonomous navigation unit 2, a change in a position is calculated using "stepSignal(t)" which is the detection result of the number of steps, "direction(t)" which is the detection result of the travel direction, and "stepSize(t)" which is the step size. The coordinates "$x_r(t)$" and "$y_r(t)$" of the relative position are calculated by Expression (8) and Expression (9) which are renewed expressions.

$$x_r(t+1) = x_r(t) + stepSignal(t) * \cos(direction(t)) * stepSize(t) \quad (8)$$

$$y_r(t+1) = y_r(t) + stepSignal(t) * (-\sin(direction(t))) * stepSize(t) \quad (9)$$

The position estimation unit 110 estimates the current position (x, y) of the pedestrian based on the absolute position of the pedestrian detected by the absolute position detection unit 1 and the position change of the pedestrian obtained from the autonomous navigation by the autonomous navigation unit 2. In the estimation of the position by the position estimation unit 110, an absolute position $(x_a, y_a)$ detected most recently and a time $t_a$ at the time of the detection are stored. Additionally, in the estimation of the position by the position estimation unit 110, a relative position (x$_r$, y$_r$) detected most recently according to the autonomous navigation is also stored together. That is, when the absolute position is detected at a given time t, the position estimation unit 110 uses the absolute position as a high reliable value. Further, when the absolute position is not detected, the position estimation unit 110 calculates a position at the time t by calculating a difference from the place of the finally detected absolute position according to the autonomous navigation. The estimation of the position by the position estimation unit 110 can be expressed by Expression (10) and Expression (11).

$$x(t) = x_a + x_r(t) - x_r(t_a) \quad (10)$$

$$y(t) = y_a + y_r(t) - y_r(t_a) \quad (11)$$

A position (x(t), y(t)) is obtained as an output of the estimation of the position by the position estimation unit 110. In this embodiment, x$_a$(t), y$_a$(t), x$_r$(t), and y$_r$(t) used in a process in the later stage are also to be output. FIG. 2 is a diagram illustrating an example of the output result by the position estimation unit 110. As illustrated in FIG. 2, the position estimation unit 110 outputs the longitude and latitude of the detected absolute position, the longitude and latitude of the relative position, and the longitude and latitude of an estimated position at each time t. For example, the position estimation unit 110 outputs the longitude "139.696844" and the latitude "35.532155" of an absolute position, the longitude "139.696844" and the latitude "35.532155" of a relative position, and the longitude "139.696844" and the latitude "35.532155" of an estimated position at the time "2011/9/9 13:10:00".

In the example illustrated in FIG. 2, the absolute position is not detected from the time "2011/9/9 13:10:15" to the time "2011/9/9 13:10:45". At this time, estimated positions are calculated based on the absolute position detected at the time "2011/9/9 13:10:10". In practice, an error may occur in the detection of the absolute position due to the influence of a multi-pass or the like. Therefore, if reliability equal to or greater than a given level can be maintained using the index of the measurement accuracy such as the DOP value above described, it may be used as the absolute position (x$_a$, y$_a$).

The updating unit 120 updates presence probability information stored in the storage unit 130 based on the position of the pedestrian estimated by the position estimation unit 110. The presence probability information is information on each of a plurality of regions and indicates a higher probability as a presence frequency of the pedestrian is higher. Specifically, the presence probability information expresses a position as coordinates and indicates a probability that the pedestrian can pass through given coordinates. The presence probability information describes a function p (x, y) indicating possibility that the pedestrian can pass at coordinates (x, y) (referred to as "pass possibility").

The presence probability information according to this embodiment describes the pass possibility of each position as a probability from 0 to 1 by subdividing the position into grids with a given size, but the description of the pass possibility is not limited thereto. For example, as the description of the pass possibility, a mixed Gaussian distribution in which a plurality of Gaussian distributions overlap each other may be used.

More specifically, as processes performed by the updating unit 120, a detected position storing process, a path calculating process, and an updating process are performed by inputting the information output by the position estimation unit 110 and the presence probability information acquired from the storage unit 130. Hereinafter, these processes will be described.

The detected position storing process is a process of buffering a position estimated by the position estimation unit 110 to construct a path which is used for the path calculating process and is a trajectory of a temporal change of a path position. For example, in the process of buffering the estimated position, position information during the recent 60 minutes is accumulated together with time information at the time of the detection. Further, since a time necessary for the buffering process is a time necessary to construct the path, the time is not limited to 60 minutes, but may be appropriately changed.

The path calculating process is a process of calculating the path by applying a history of the position calculation result according to the autonomous navigation between a starting point and an ending point as positions with given reliability. As described above, when the absolute position can be detected, the position is used as a position with the given reliability. Since there is a possibility that errors may be accumulated in the calculation of the position according to the autonomous navigation, most of the errors are caused due to a detection error of the travel direction and a detection error of the step size. However, the detection error of the travel direction and the detection error of the step size are small as a temporal change in many cases. Further, in the detection of the number of steps, an error is considered to be relatively small. That is, most of the errors are expressed as "rotation" which is the detection error of the travel direction and "expansion and contraction" which is the detection error of the step size in many cases.

Accordingly, assuming that a time "t$_s$" and a time "t$_e$" are the starting point and the ending point as the positions with the given reliability and the two points are the exact positions, a path between the two points is calculated. More specifically, by correcting the starting point and the ending point by the "rotation" and the "expansion and contraction" of the autonomous navigation, the path is calculated. For example, positions "x'(t)" and "y'(t)" on the path whose starting point and ending point has been corrected are calculated using an expansion and contraction correction value "dl" and a rotation correction value "dθ" by using Expression (12) to Expression (18). In Expression (12) to Expression (18), the positions "x'(t)" and "y' (t)" are corrected to coordinates obtained by rotating the trajectory of the position change according to the autonomous navigation from a time t$_s$ to a time t by dθ on the assumption that coordinates (x$_{as}$, y$_{as}$) are the starting point, and by expanding or contracting the trajectory by dl.

$$\text{length}(x_s, y_s, x_e, y_e) = \sqrt{(x_e - x_s)^2 + (y_e - y_s)^2} \quad (12)$$

$$dl = \frac{\text{length}(x_{as}, y_{as}, x_{ae}, y_{ae})}{\text{length}(x_{rs}, y_{rs}, x_{re}, y_{re})} \quad (13)$$

$$V_a = (x_{ae} - x_{as}, y_{ae} - y_{as})^T \quad (14)$$

$$V_r = (x_{re} - x_{rs}, y_{re} - y_{rs})^T \quad (15)$$

$$d\phi = a\cos\left(\frac{V_r \cdot V_a}{|V_r||V_a|}\right) \quad (16)$$

$$x'(t) = x_{as} + dl((x_{re}(t) - x_{rs})\cos d\theta - (y_{re}(t) - y_{rs})\sin d\theta) \quad (17)$$

$$y'(t) = y_{as} + dl((x_{re}(t) - x_{rs})\sin d\theta - (y_{re}(t) - y_{rs})\cos d\theta) \quad (18)$$

Figure 3:
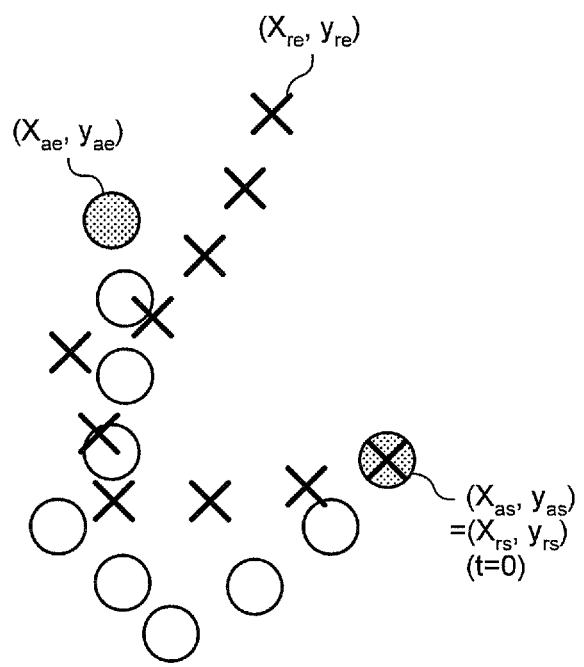
FIG. 3 is a diagram illustrating a path calculating process according to the first embodiment.

FIG. 3 is a diagram illustrating the path calculating process according to the first embodiment. In the example illustrated in FIG. 3, circle marks indicate actual positions. Among the circle marks, white circle marks indicate undetected positions and hatching circle marks indicate partially detected positions (absolute positions). Among the hatching circle marks, the right circle mark indicates a starting point at the time $t_s$. In the example illustrated in FIG. 3, cross marks indicate position change according to the autonomous navigation. Among the cross marks, the cross mark at the time "t=0" accords with the starting point. That is, at this time, the absolute position and the relative position overlap each other. After the time "t=0", a difference occurs over time between the absolute position and the relative position due to an error. In the example illustrated in FIG. 3, a detection error of the normal travel direction, that is, an error of an angle occurs. Therefore, when the ending point ($X_{ae}$, $y_{ae}$) is detected, the process of updating the presence probability information is performed at the time $t_e$. Then, the trajectory of the circle marks illustrated in FIG. 3 can be obtained as a more exact path through correction of the rotation by fixing the starting point.

The updating process is a process of updating the presence probability information stored in the storage unit 130 using the path information calculated through the path calculating process. As described above, the presence probability information is information which indicates a higher probability as the presence frequency of the pedestrian is higher. The presence probability information expresses the position as coordinates and indicates the probability that the pedestrian can pass through given coordinates. The presence probability information resembles a map, but is different from a simple map, since a place where the pedestrian can pass is not indicated in a general map in some cases. However, the presence probability information may be generated by setting a presence probability of places where the pedestrian cannot pass to a low value and setting a presence probability of places where the pedestrian can pass to a relatively high value based on map information.

Figure 4:
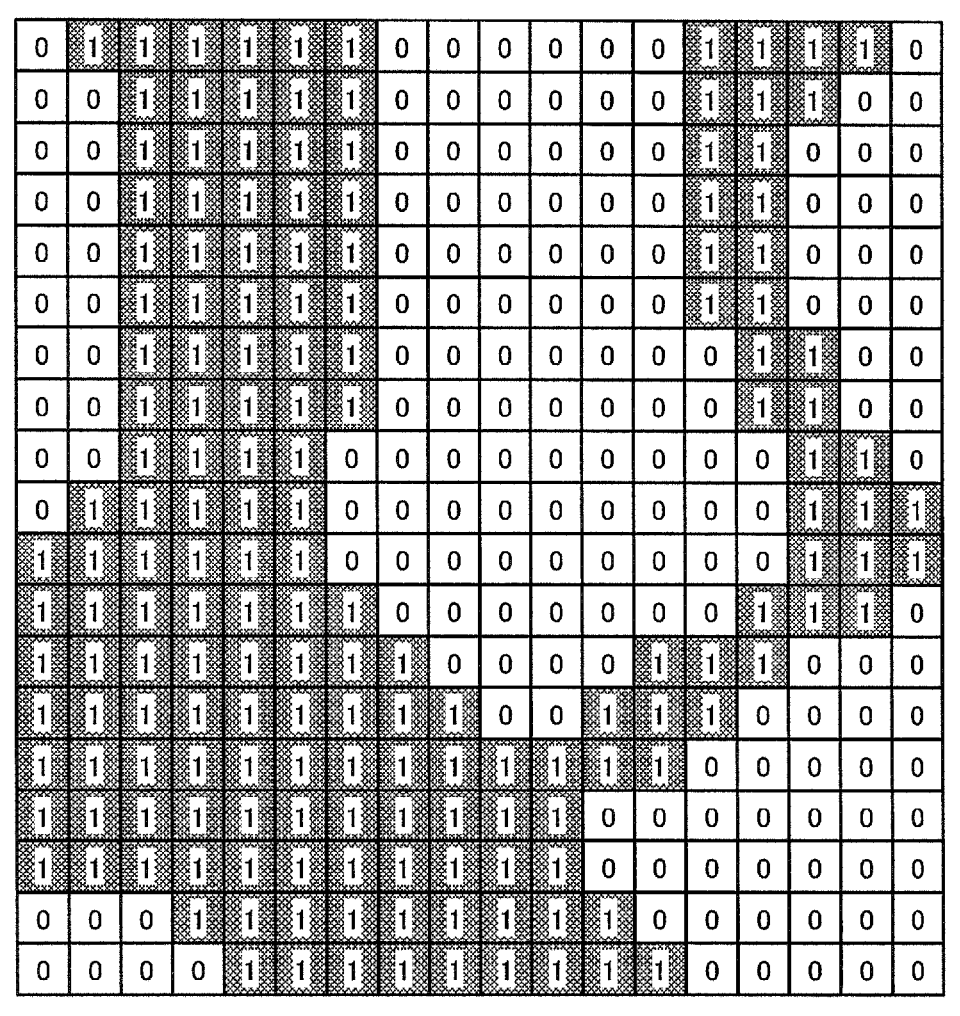

In the presence probability information, the grid of the position is identified by a longitude and a latitude. A grid size of the presence probability information is set to 1 meter in four directions as one mode. That is, the presence probability information has a data structure in which one presence probability given with a probability value from 0 to 1 is provided for each grid of the unit of 1 meter identified by a longitude and a latitude. FIG. 4 is a diagram illustrating an example of target presence probability information. As illustrated in FIG. 4, in the target presence probability information, presence probabilities are arranged in an order of the coordinates of the grids. As probability values, "1" indicates a place where the pedestrian can pass, and "0" indicates a place where the pedestrian cannot pass. The presence probability information may be treated by three-dimensional grids based on floor information of a building in addition to the longitude and the latitude. In this embodiment, when the probability value of the presence probability information is initially not present, a value such as "0.2" may be set for all of the probability values.

Here, there is no error in the path information, the probability values of the grids on the path are updated to "1" in the process of updating the presence probability information. In practice, however, there is an error in the path information, the probability values are updated based on the repeatedly detected path information in order to obtain the more exact presence probability information. In this embodiment, the updating process is performed using Expression (19) and Expression (20).

$$p(x, y) \leftarrow p(x, y) + \gamma(1 - p(x, y)) \quad (x \in x'(t), y \in y'(t) \exists t \geq t_s) \quad (19)$$

$$\forall p(x, y) \leftarrow p(x, y) \frac{N_x N_y P_{max}}{\sum_x \sum_y p(x, y)} \quad \left(\text{if} \sum_x \sum_y p(x, y)\right) \quad (20)$$

In Expression (19), "γ" is an updating ratio and is assumed to take, for example, a value such as "0.3". The updating ratio indicates a ratio at which the path information to be used is reflected to the presence probability information. When the path information to be used is correct, the updating ratio is preferably set to be high. $N_x$ and $N_y$ are the maximum values of the grid in the x direction and the y direction. "$N_x N_y$" indicates the total grid. $P_{max}$ is the maximum value of the regulated average probability and is assumed to take, for example, a value such as "0.5".

Figure 5:
FIG. 5 is a diagram illustrating presence probability information according to the first embodiment.

Through the process, the probability is closer to "1" in a place on the path in the presence probability information. By repeatedly performing the updating process, the probability is gradually closer to "1". FIG. 5 is a diagram illustrating an example of the presence probability information stored in the storage unit 130 according to the first embodiment. As illustrated in FIG. 5, in the presence probability information, the probability values from "0.0" to "1.0" are indicated in the grids through the above-described process. When simply approaching the probability of a place where the frequency of pedestrian presence is high to "1", the probabilities in all the grids may be closer to "1" when an error is included. Accordingly, in this embodiment, the updating process is performed such that the average probability in all the grids does not exceed a given value. As a result, in the updating process, the presence probability of the place where the frequency of the presence is high is closer to "1" in principle; however, even though the pedestrian can pass actually, the presence probability of a place where the frequency of the presence is low may be a value close to "0" (or "0") in some cases.

Based on the presence probability information stored in the storage unit 130, the position correction unit 140 corrects the position estimated by the position estimation unit 110 so that the pedestrian is present at a high probability place. In the position correcting process performed by the position correction unit 140, not only instantaneous deviation of a position is corrected, but the correction is performed so that a likelihood is high for the entire path where the pedestrian passes. Here, when the pedestrian passes through a place where the presence probability is low, there is an error in an estimated position, and thus it is generally considered that a technique for correcting the place to a place where the presence probability is high near the estimated position is performed. In this embodiment, differently, the correction is performed such that an accumulative likelihood of the presence probability information for the entire path where the pedestrian passes is maximized. For example, a correction parameter is obtained, as in Expression (21), using the above-described path calculating process.

$$\underset{\theta, 1}{\mathrm{argmax}} \sum_{x'} \sum_{y'} p(x'(t), y'(t)) \; \forall \, t \geq t_s \quad (21)$$

That is, a rotation correction value "θ" and an expansion and contraction correction value "l" are obtained so that the total sum of the probability values of the grids included in the corrected path can be maximized. In practice, the maximized θ and l are obtained by discretely changing θ and l within given ranges, for example, "−30<θ<30" and "0.8<l<1.2" and calculating the total sum of the probability values for the rotation correction value and the expansion and contraction correction value. Here, when the likelihoods are the same, the correction amount is small in a case in which the rotation correction value θ is close to "0" and the expansion and contraction correction value 1 is close to "1", and thus an excellent result can be said to be obtained. As a constraint on the considerable increase of the correction amount, it is effective to maximize a value obtained by subtracting a regularization term "c1θ+c21" from the term of the likelihood. The coordinates (x'(t), y'(t)) obtained after the correction of the estimated position and indicating the actual path and position can be expressed using the rotation correction value "θ" and the expansion and contraction correction value "l" by Expression (22) and Expression (23).

$$x'(t)=x_{as}+l((x_{re}(t)-x_{rs})\cos\theta-(y_{re}(t)-y_{rs})\sin\theta) \quad (22)$$

$$y'(t)=y_{as}+l((x_{re}(t)-x_{rs})\sin\theta+(y_{re}(t)-y_{rs})\cos\theta) \quad (23)$$

By correcting the estimated position in this way, particularly, it is possible to correct the "rotation" which is the detection error of the travel direction as a cause of a large error in the autonomous navigation of the pedestrian and the "expansion and contraction" which is the detection error of the step size. Thus, the exact position can be obtained.

Figure 6:
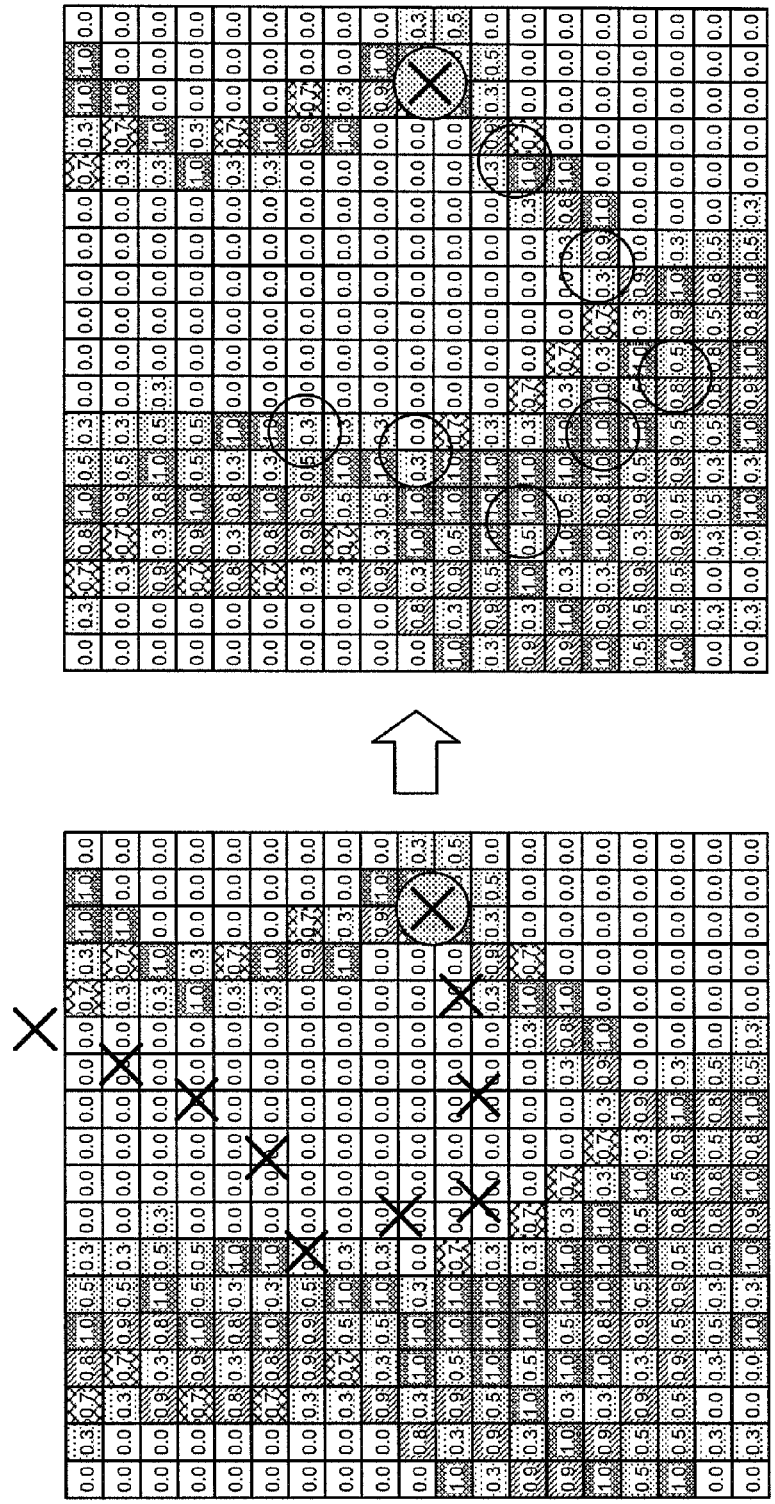
FIG. 6 is a diagram illustrating a position correcting process according to the first embodiment.

FIG. 6 is a diagram illustrating the position correcting process according to the first embodiment. In the example illustrated in FIG. 6, the exact absolute positions are not obtained after the hatching circle mark which is a starting point, and thus estimated positions indicated by cross marks are detected as the relative positions according to the autonomous navigation (see the left side of FIG. 6). In a trajectory of the cross marks, a pedestrian is assumed to pass through places where the presence probability is low. As described above, when the trajectory is corrected so that the likelihood can be maximized using the presence probability information, the correction result indicated by circle marks can be obtained (see the right side of FIG. 6).

Figure 7:
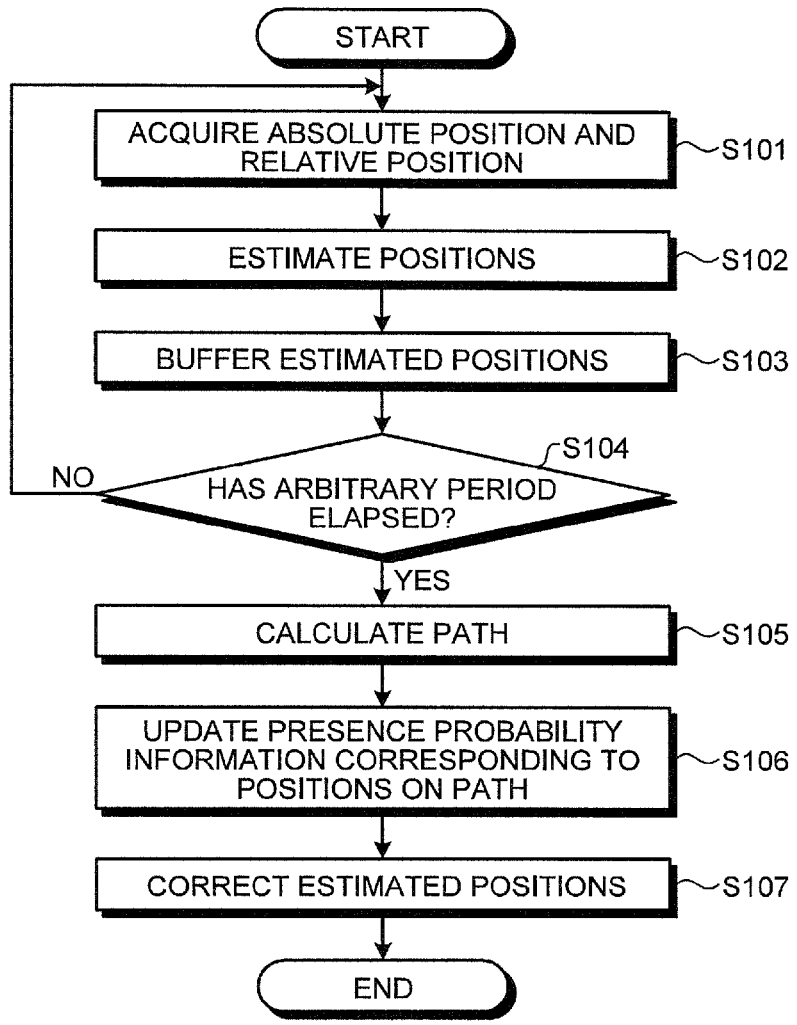
FIG. 7 is a flowchart illustrating a flow of all the processes according to the first embodiment.

Next, a flow of all the processes according to the first embodiment will be described with reference to FIG. 7. FIG. 7 is a flowchart illustrating an example of the flow of all the processes according to the first embodiment.

As illustrated in FIG. 7, the position estimation unit 110 acquires the absolute position of a pedestrian detected by the absolute position detection unit 1 and the relative position which is a position change of the pedestrian obtained by the autonomous navigation unit 2 according to the autonomous navigation (step S101). Then, the position estimation unit 110 estimates the current positions of the pedestrian based on the absolute position and the relative position (step S102).

The updating unit 120 buffers the positions of the pedestrian estimated by the position estimation unit 110 (step S103). When the updating unit 120 determines that an arbitrary period such as 60 minutes has elapsed (Yes in step S104), the updating unit 120 calculates a path of the positions corrected using the expansion and contraction correction value and the rotation correction value based on the buffered positions (step S105). When the updating unit 120 determines that the arbitrary period has not elapsed (No in step S104), the process of step S101 is performed again, and the estimation and the buffering of the positions used to calculate the path are performed.

Subsequently, the updating unit 120 updates the presence probability information stored in the storage unit 130 using the calculated path (step S106). Then, the position correction unit 140 corrects the path including the positions estimated by the position estimation unit 110 based on the presence probability information stored in the storage unit 130 so that the pedestrian is present at a position where the probability is high (step S107). The correction of the estimated positions may not be performed after the presence probability information is updated, but may be performed after the position estimation unit 110 estimates the positions. That is, the process of updating the presence probability information is preferably performed at an acquisition timing of the starting point or the ending point having the given reliability. The process of correcting the estimated positions can be performed at a position-estimated timing, as needed.

As described above, the positions can be output with high accuracy based on the relative positions according to the autonomous navigation by correcting the estimated positions based on the presence probability information while updating the presence probability information. In other words, by allowing only some positions (absolute positions) to be detectable with high accuracy in several indoor place or by allowing only the position (absolute position) of an entrance of a building to be detectable with high accuracy, an actual map dependent on a pass probability different from a room layout diagram can be generated. Further, by successively updating the presence probability information, the more exact correction is performed in many cases for detecting the actual positions of the pedestrian, compared to the map in which the pass possibility position is set to "1" and the pass impossibility position is set to "0". In particular, the invention is not limited to the application to the indoor places. When there is an error in an outdoor place in the detection of the absolute position, the detailed position detection according to the autonomous navigation may be used together. As a result, in this embodiment, it is possible to specify the position of the pedestrian with ease and with high accuracy.

Modification Example of Position Correcting Process According to First Embodiment In the above-described first embodiment, the case has been described in which the path where the pedestrian passes is obtained using the rotation correction value and the expansion and contraction correction value. However, an angular velocity correction value may be further used. More specifically, detection of a posture using an angular velocity sensor such as a gyro sensor is used in the autonomous navigation. In this case, a change in an angle is obtained by integration of the angular velocities. However, an error of the angular velocity may be added to a trajectory in the autonomous navigation due to an error of the gyro sensor. Accordingly, there is a possibility that the trajectory is considered to be a constantly rotating circular movement although the trajectory is actually a straight-line movement.

In regard to this problem, the estimated positions can be corrected, as in the first embodiment, by calculating an angular velocity correction value "φ" so that the likelihood is maximized by Expression (24) and recalculating the path using the calculated angular velocity correction value "φ".

$$\underset{\theta,1,\phi}{\operatorname{argmax}} \sum_{x'} \sum_{y'} p(x'(t), y'(t)) \; \forall \, t \geq t_s \quad (24)$$

Second Embodiment

Figure 8:
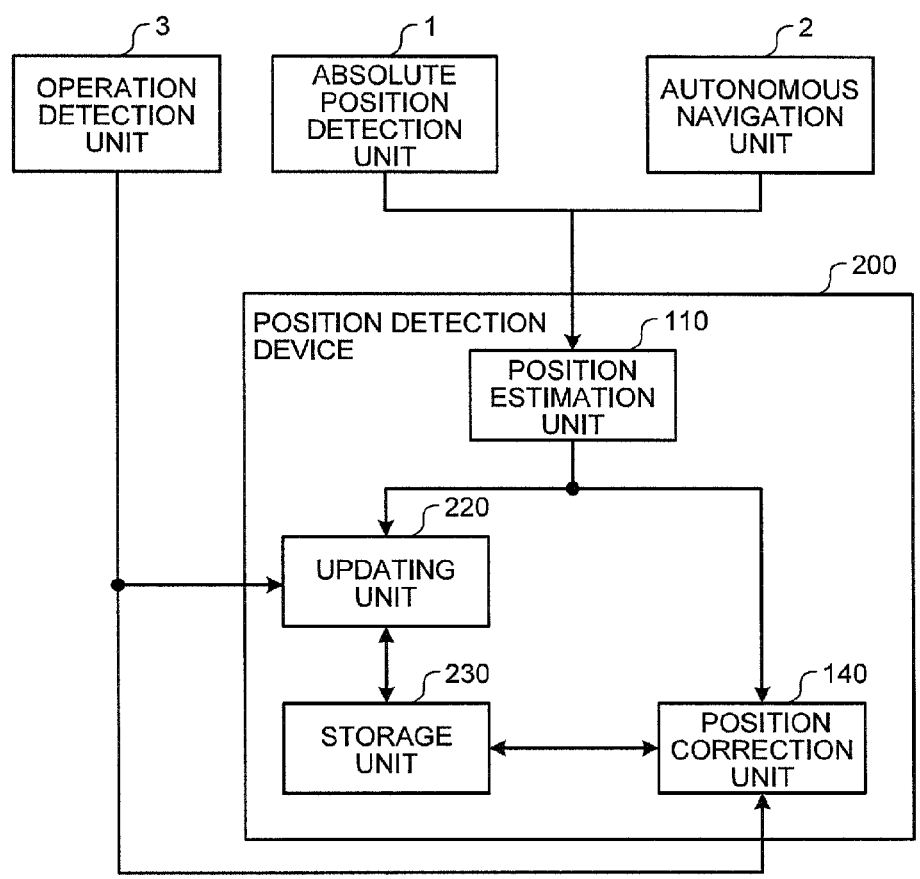
FIG. 8 is a block diagram illustrating a position detection device according to a second embodiment.

FIG. 8 is a block diagram illustrating a configuration example of a position detection device according to a second embodiment. In the second embodiment, the same reference numerals are given to constituent elements having the same configuration as that of the first embodiment and the detailed description of the same configuration will not be sometimes repeated. In the second embodiment, the functions, the configurations, and the processes other than an action detection unit 3, an updating unit 220, and a storage unit 230 to be described below are the same as those of the first embodiment.

As illustrated in FIG. 8, the position detection device 200 includes a position estimation unit 110, the updating unit 220, the storage unit 230, and a position correction unit 140. The position detection device 200 acquires not only the absolute position from the absolute position detection unit 1 but also the relative position of the autonomous navigation unit 2. The position detection device 200 also acquires an action of a pedestrian (user) from the action detection unit 3. Examples of the action include elevator transportation, payment, rest at an intersection or a station platform, and unloading. In this embodiment, since a place where an action of the pedestrian is performed is limited according to a kind of action, an estimated position is corrected by correcting a position at which a specific action is detected to a position at which there is a high possibility that the specific action is performed.

The action detection unit 3 detects an action of the pedestrian. For example, regarding a payment action, when a payment event of an electronic money is detected by a terminal device, the fact that the payment action is performed is output to the position detection device 200. When the payment action occurs at a time t, an action detection function "$act_{pay}(t)=1$" is set, and in the other cases, an action detection function "$act_{pay}(t)=0$" is set.

For example, regarding detection of a rest state, a value of an acceleration sensor mounted on the terminal device is used. More specifically, in the detection of the rest state, a vector length is constantly calculated for an acceleration sensor value "a(t)" of a three-dimensional vector, and a dispersion value "v(t)" of the vector length for a given time such as 10 seconds is calculated. When the dispersion value is equal to or less than a threshold value such as "0.001", the detected state is considered as a rest state. The dispersion value "v(t)" is expressed by Expression (25).

$$v(t) = \text{var}(|a(t)|) \quad (25)$$

$$= \left(\frac{\sum_{t=now}^{now-T+1} |a(t)|^2}{T}\right) - \left(\frac{\sum_{t=now}^{now-T+1} |a(t)|}{T}\right)^2$$

For example, regarding elevator transportation, a short-range wireless base station of the BlueTooth (registered trademark) or the like is provided in an elevator. When the terminal device can perform wireless communication, the pedestrian is considered to be transported by an elevator. Further, the elevator transportation may be estimated from the acceleration sensor, as in the rest state. As another case of the elevator transportation, when the face of a subject is detected by a camera in the elevator, the subject may be considered to be transported by the elevator. Regarding a rest action at an intersection or a station platform and an unloading action, the pedestrian is detected by wireless communication or a camera, as in the elevator transportation. That is, the action detection unit 3 is included in the terminal device in some cases or is the camera (network camera) in some cases, as in the absolute position detection unit 1, the autonomous navigation unit 2, or the like. Further, a plurality of action detection units 3 may be provided rather than the single unit. The detection of the action by the action detection unit 3 is not limited to the above-described detection. Methods for detecting the pedestrian using various sensors can be considered.

The presence probability information stored in the storage unit 230 has the same data structure as the presence probability information according to the first embodiment. In the presence probability information according to the second embodiment, a possibility "$p_{action}(x, y)$" is held for each specific action. Further, the presence probability information according to the second embodiment is prepared in advance in some cases and is updated by the updating unit 220 in some cases. The case in which the presence probability information is prepared in advance is, for example, a case in which places where there is a possibility that the payment, the elevator transportation, the unloading, or the like is performed are registered. When the elevator is located at the coordinates (3, 5), "$p_{elevator}(3, 5)=1.0$" is set.

In the updating process performed by the updating unit 220, the path calculation is performed and the updating is performed to increase a probability of a target action at a position at which the pedestrian is present when the pedestrian performs a specific action detected by the action detection unit 3. In this embodiment, the updating process is performed using Expression (26) and Expression (27).

$$p_{action}(x, y) \leftarrow p_{action}(x, y) + \gamma(1 - p_{action}(x, y)) \begin{pmatrix} \text{if } x \in x'(t), \\ y \in y'(t), act_a(t) = 1 \end{pmatrix} \quad (26)$$

$$p(x, y) \leftarrow p(x, y) \frac{N_x N_y P_{max}}{\sum_x \sum_y p(x, y)} \left( \text{if } \sum_x \sum_y p(x, y) \geq N_x N_y P_{max} \right) \quad (27)$$

Figure 9:
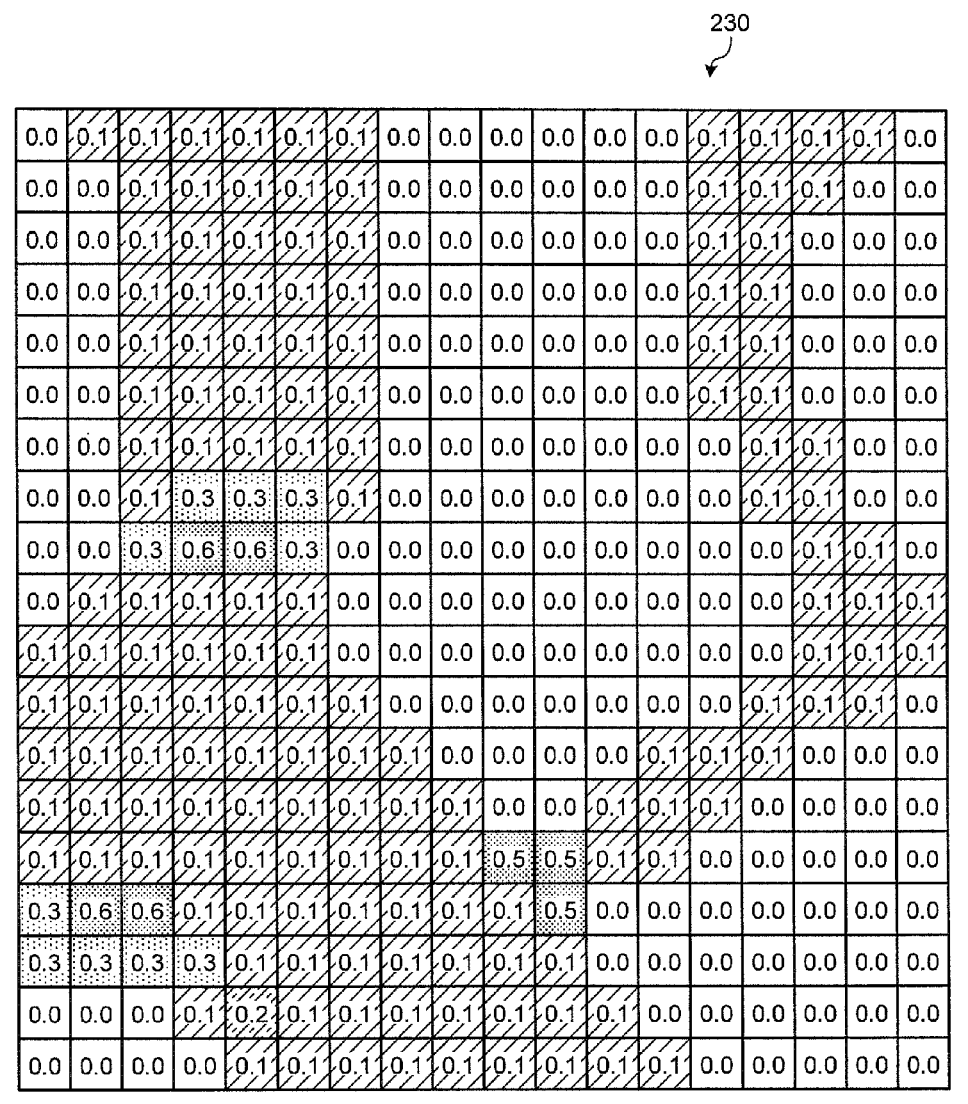

FIG. 9 is a diagram illustrating an example of the presence probability information stored in the storage unit 230 according to the second embodiment. As illustrated in FIG. 9, in the presence probability information, the probability values from "0.0" to "1.0" are shown in the grids. In the grids illustrated in FIG. 9, places with a high probability value correspond to places where the above-described specific actions are performed. By repeatedly performing the updating process on the presence probability information, the probability is gradually closer to "1".

When target actions are one kind of action, the position correction unit 140 calculates correction parameters θ and l from Expression (28), as in the first embodiment.

$$\underset{\theta, l}{\text{argmax}} \sum_{x'} \sum_{y'} p_{action}(x'(t), y'(t)) \; \forall \, t \geq t_s \quad (28)$$

Figure 10:
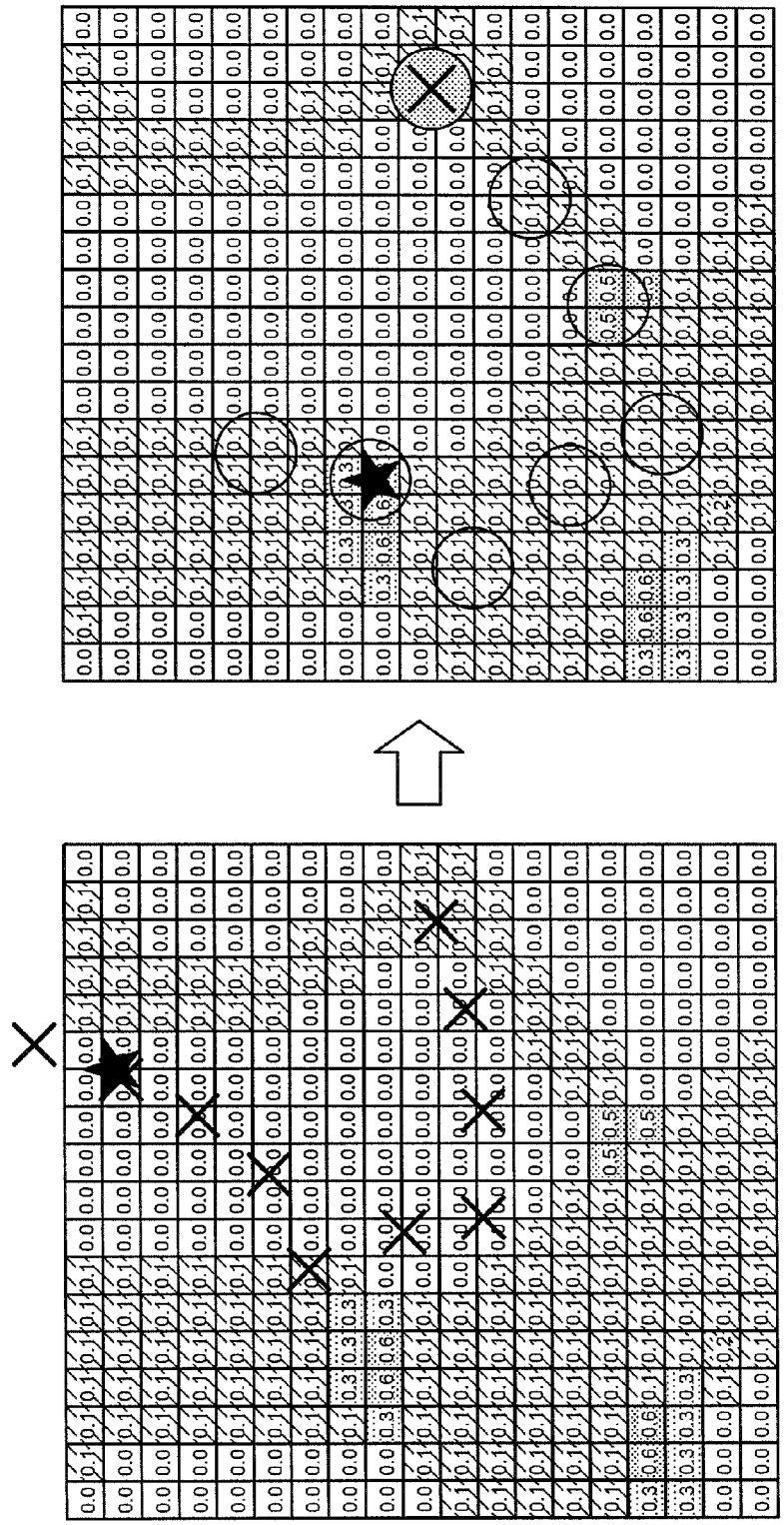
FIG. 10 is a diagram illustrating a position correcting process according to the second embodiment.

FIG. 10 is a diagram illustrating the position correcting process according to the second embodiment. In the example illustrated in FIG. 10, estimated positions indicated by cross marks are detected as relative positions according to the autonomous navigation in which exact absolute positions are not obtained (see the left side of FIG. 10). A star mark illustrated on the left side of FIG. 10 indicates a position at which a specific action is performed by a user. In a trajectory of the cross marks, a pedestrian is assumed to pass through places where the presence probability is low. In the trajectory, by overlapping the position indicated by the star mark on the position of the pre-registered and corresponding specific action, the entire path can be corrected and the correction result indicated by circle marks can be obtained (see the right side of FIG. 10). At this time, since the corrected values of the parameters θ and 1 can be obtained, the relative positions according to the subsequent autonomous navigation can be also corrected with more accuracy.

Herein, when plural kinds of target actions are present, a weight coefficient is used. For example, regarding a payment action, the place is limited to a position of a ticket gate, a store, or the like. Further, in the detection of the payment action, since an error cause is considered to be small, a weight coefficient "$q_{pay}=1$" is set. Regarding an elevator transportation, since the occurrence frequency of an error is low in the detection, a weight coefficient "$W_{elevator}=0.7$" is set. Regarding the rest at an intersection, since the occurrence frequency is high, the position range is wide, and there are various causes such as signal rest, wait, and taxi wait, a weight coefficient "$w_{rest}=0.2$" is set. In this way, by calculating the correction parameter by Expression (29) using the weight coefficient for each specific action, the correction of the estimated position varies. After the calculation of the correction parameter, the position correction unit 140 corrects the estimated position, as in the first embodiment.

$$\underset{\theta,1}{\operatorname{argmax}} \sum_{action} \sum_{x'} \sum_{y'} w_{action} p_{action}(x'(t), y'(t)) \ \forall \ t \geq t_s \quad (29)$$

Figure 11:
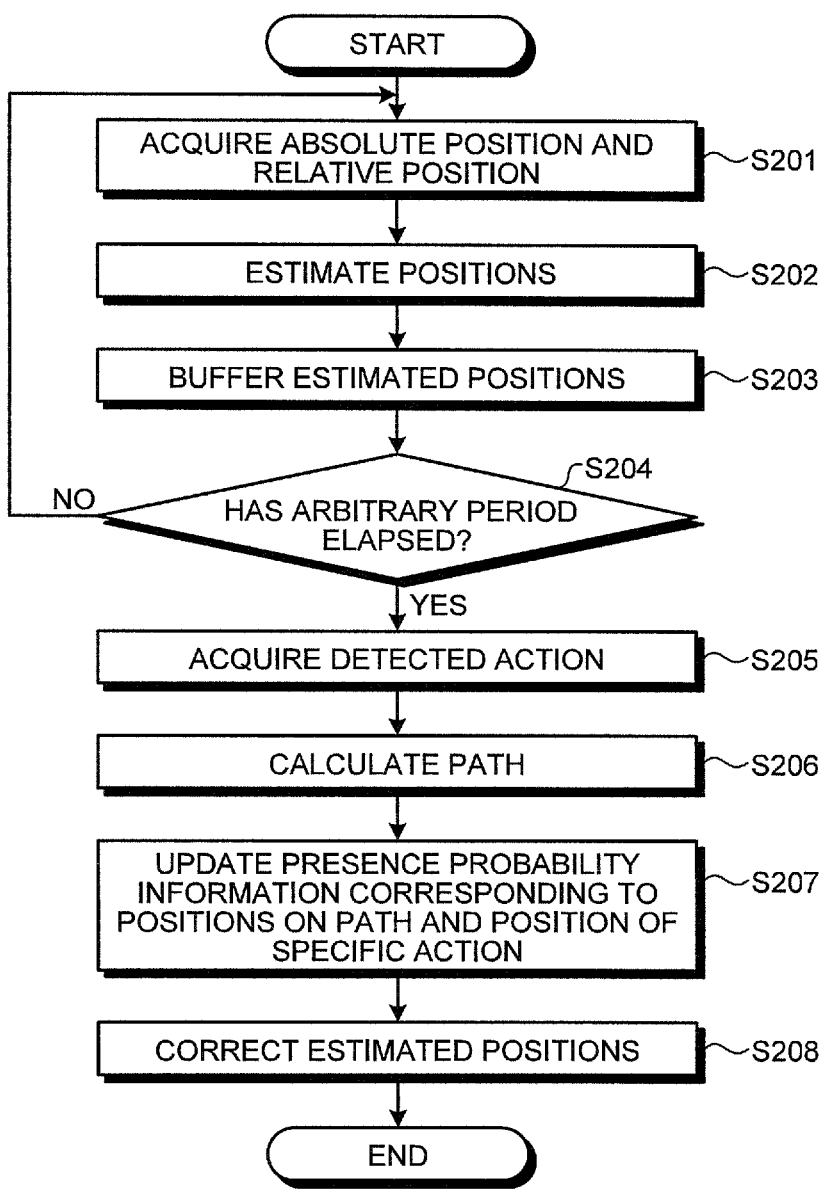
FIG. 11 is a flowchart illustrating a flow of all the processes according to the second embodiment.

Next, a flow of all the processes according to the second embodiment will be described with reference to FIG. 11. FIG. 11 is a flowchart illustrating an example of the flow of all the processes according to the second embodiment. The same processes as all of the processes according to the first embodiment will not be sometime described. Specifically, step S201 to step S204 are the same as step S101 to step S104.

As illustrated in FIG. 11, when the updating unit 220 determines that an arbitrary period has elapsed (Yes in step S204), the updating unit 220 acquires an action detected by the action detection unit 3 (step S205). Then, the updating unit 220 calculates a path based on the buffered positions (step S206) and updates the presence probability information stored in the storage unit 230 to increase a probability of a target action at the position at which the pedestrian is present when the pedestrian performs the specific action detected by the action detection unit 3 (step S207). Then, based on the presence probability information stored in the storage unit 230, the position correction unit 140 corrects the path including the positions estimated by the position estimation unit 110 so that the pedestrian is present at the position with a high probability (step S208).

As described above, when the user performs an action for which the positions are limited, the correction is performed such that the trajectory of the user overlaps the position of the pre-registered and corresponding specific action. Therefore, the position of the pedestrian can be specified with ease and with high accuracy. Even when the position of an elevator or the like is not known, the estimation accuracy of the position of the elevator or the like is improved using the appropriately updated presence probability information.

The presence probability information is updated by position information in which an error is included or by detection of an action. However, the influence of the error is reduced by repeatedly updating the presence probability information using much information. That is, by appropriately updating the presence probability information from the positions or actions of a plurality of users, the positions of the users can be specified with higher accuracy.

Third Embodiment

The embodiments of the position detection device have been described above, but various different embodiments other than the above-described embodiment may be realized. Thus, other embodiments of (1) a correction parameter, (2) a configuration, and (3) a program will be described.

(1) Correction Parameter

In the above-described embodiments, the position correcting process of correcting the estimated position using the correction parameters 1 and θ has been described. In the calculated correction parameters, the step size "stepSize(t)" in the autonomous navigation process may be multiplied by "1", and "θ" may be added to the travel direction "direction (t)". That is, even when the calculated correction parameters are applied at the time of output in the autonomous navigation process, the same result can be obtained.

(2) Configuration

The process procedures, the control procedures, the specific names, and information including various kinds of data, parameters, and the like described in the above-described document or drawings may be arbitrarily modified, as long as not otherwise mentioned. For example, the presence probability information described in the drawings is merely an example and is changed by performing the repeated updating process.

Figure 12:
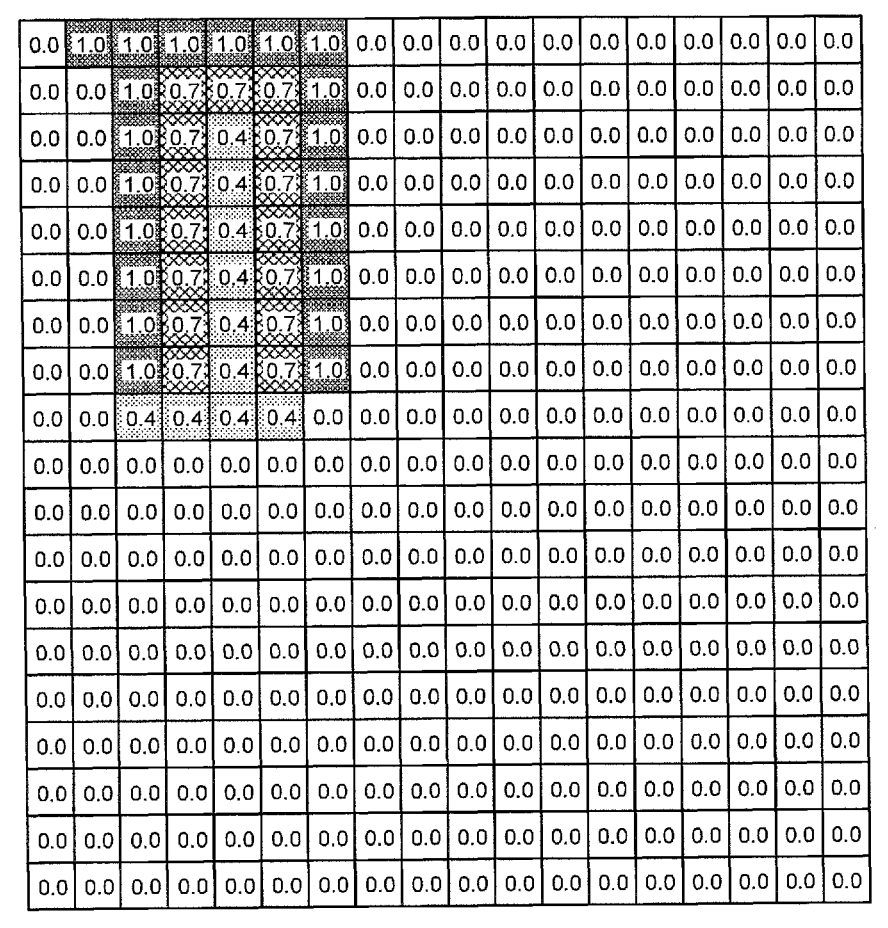

The presence probability information may hold only a probability value regarding a specific action. FIG. 12 is a diagram illustrating an example of presence probability information according to a third embodiment. FIG. 12 illustrates the presence probability information holding a probability value of a place where an unloading action is performed as one example. As illustrated in FIG. 12, places in the grid with probability values of "0.4" to "1.0" are places where the unloading action is performed. A place in the grid with the probability value of "0.0" is a place where an action other than the unloading action is performed, a place where a pedestrian may pass, or a place where a pedestrian may not pass. In an example illustrated in FIG. 12, since a place is specified to the place where the unloading action is performed, the probability value of a place other than the place where the unloading action is performed is set to "0.0".

Figure 13:
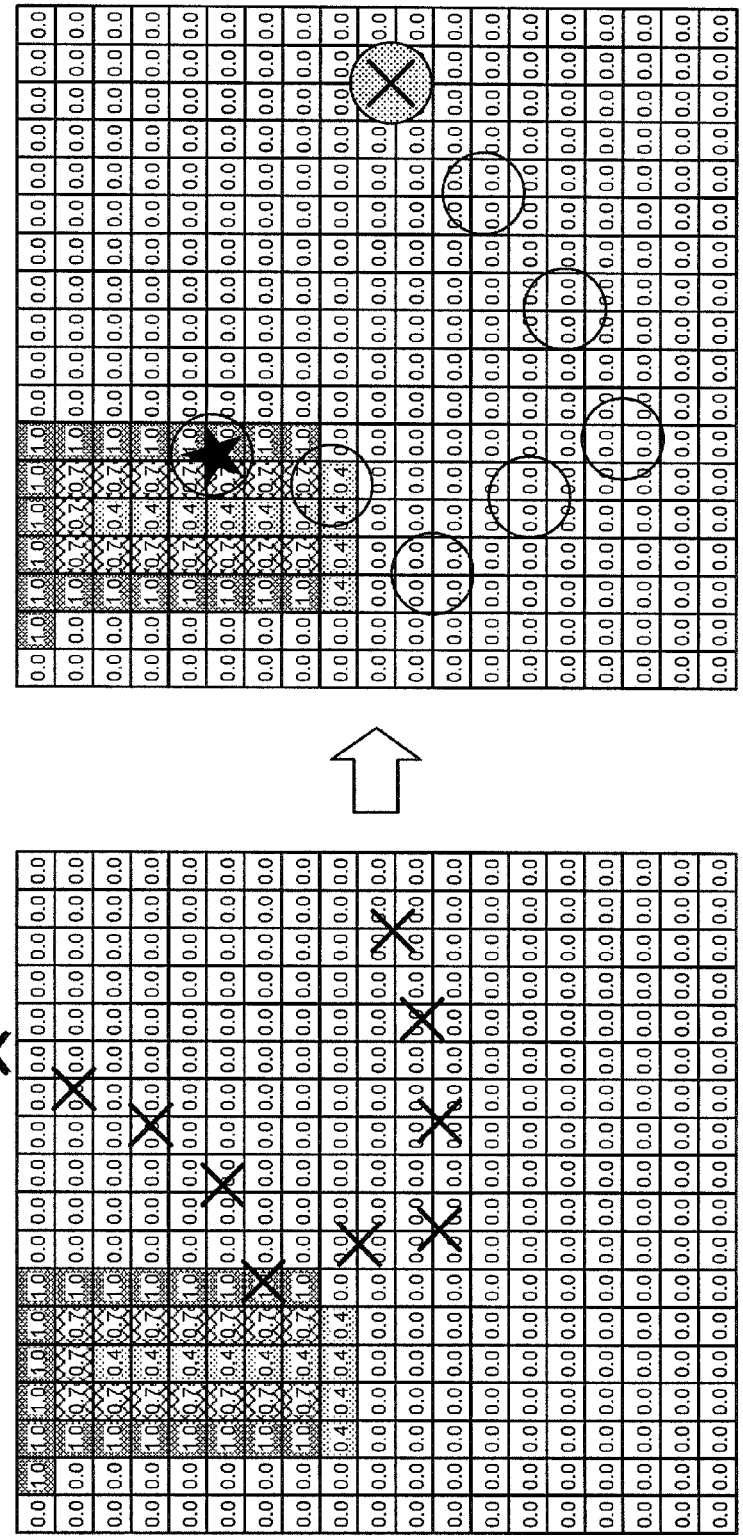
FIG. 13 is a diagram illustrating a position correcting process according to the third embodiment.

FIG. 13 is a diagram illustrating a position correcting process according to the third embodiment. In an example illustrated in FIG. 13, as in the second embodiment, estimated positions indicated by cross marks are detected as relative positions according to the autonomous navigation in which an exact absolute position is not obtained (see the left side of FIG. 13). A star mark illustrated in the left side of FIG. 13 indicates a position at which a specific action is performed by a user. Here, the specific action is assumed to be an unloading action. In a trajectory of the cross marks, the pedestrian is assumed to pass through the places with the presence probability of "0.0". In the example illustrated in FIG. 13, since only the probability values regarding the specific action as the unloading action are illustrated and there is no probability value for the pass possibility other than the specific action, the pedestrian is assumed to pass through places with the presence probability of "0.0".

When the entire path is corrected in the trajectory by overlapping the position indicated by the star mark on the position of the specific action which is the pre-registered and corresponding unloading action, the correction result indicated by circle marks can be obtained (see the right side of FIG. 13). At this time, by obtaining the correction values of the parameters θ and 1, a relative position according to the subsequent autonomous navigation can be also corrected with more accuracy.

The constituent elements of each device illustrated in the drawings are conceptually functional constituent elements, and thus may not be necessarily configured as physical constituent elements, as illustrated in the drawings. That is, distributed or integrated specific forms of each device are not limited to the form illustrated in the drawing, but all or some of the forms may be distributed or integrated functionally or physically in any unit depending on various liabilities, use statuses, or the like. For example, in the above-described embodiments, the cases have been described in which the presence probability information is updated based on the position of a pedestrian, or the position of a pedestrian and an action of the pedestrian. However, functional distribution may be realized so that the presence probability information is updated based on only an action of a pedestrian.

For example, the case has been described in which the position estimation unit 110 and the position correction unit 140 are included in the position detection device 100. However, the position estimation unit 110 and the position correction unit 140 may be included in a terminal device, as in the absolute position detection unit 1 or the autonomous navigation unit 2. That is, the position detection device may be realized as a server device that provides information regarding the position correction or performs the position correcting process, or may be realized as a cloud that provides information regarding the position correction or realizes a service to perform the position correcting process. The information regarding the position correction is information in which information obtainable of a plurality of users is aggregated. The position detection device is configured to provide information for the position correction by performing big data analysis to efficiently process large amounts of data.

(3) Program

The position detection device according to the above-described embodiments and modification examples includes a control device such as a CPU (Central Processing Unit), a storage device such as a ROM or a RAM, an external storage device such as an HDD or an SSD, a display device such as a display, an input device such as a mouse or a keyboard, and a communication device such as a communication I/F, and thus has a hardware configuration using a general computer.

A position detection program executed by the position detection device according to the above-described embodiments and modification examples is stored and provided as a file of an installable format or an executable format in a computer-readable storage medium such as a CD-ROM, a CD-R, a memory card, a DVD, or a flexible disk (FD).

The position detection program executed by the position detection device according to the above-described embodiments and modification examples may be stored on a computer connected to a network such as the Internet and may be downloaded via the network to be provided. Further, the position detection program executed by the position detection device according to the above-described embodiments and modification examples may be provided or distributed via a network such as the Internet. Furthermore, the position detection program executed by the position detection device according to the above-described embodiments and modification examples may be embedded in advance in the ROM or the like may be provided.

The position detection program executed by the position detection device according to the above-described embodiments and modification examples has a module structure so that each of the above-described units is realized on a computer. Each of the above-described units is realized on a computer, for example, when, as actual hardware, the CPU reads the program on the RAM from the HDD and executes the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A position detection device comprising:
a position estimation unit, implemented as processing circuitry, configured to estimate a position of a moving object based on an absolute position of the moving object and a position change of the moving object obtained from autonomous navigation;
a position correction unit configured to correct, based on presence probability information which is information on each of a plurality of regions and indicates a higher probability as a presence frequency of the moving object is higher, the estimated position of the moving object so that the moving object is present at a position with a high probability;
an updating unit configured to update the presence probability information based on at least one of the estimated position of the moving object and an action of the moving object, wherein
the position correction unit corrects the estimated position of the moving object based on the updated presence probability information,
in a case of updating the presence probability information based on the estimated position of the moving object, the updating unit updates the presence probability information by increasing the probability indicated as the presence probability information corresponding to the estimated position of the moving object, and
the updating unit updates the presence probability information by calculating a path on which the moving object passes from the position of the moving object estimated during an arbitrary period and ascending the presence probability information corresponding to a position at which the moving object is present on the calculated path.

2. The device according to claim 1, wherein, in a case of updating the presence probability information based on the action of the moving object, when a specific action is performed by the moving object, the updating unit updates the presence probability information by increasing the probability indicated as the presence probability information corresponding to a position at which the specific action that is registered in advance is performed.

3. The device according to claim 2, wherein the position correction unit changes the correction of the estimated position of the moving object according to a kind of the specific action that is registered in advance.

4. The device according to claim 1, wherein the position correction unit corrects the estimated position of the moving object by setting the absolute position of the moving object as a starting point of the path and performing at least one of an expansion and contraction correction of correcting a movement width of the moving object and a rotation correction of correcting a travel direction of the moving object at a position in which the moving object is present on the path after the starting point.

5. A position detection method comprising:
- estimating, by processing circuitry, a position of a moving object based on an absolute position of the moving object and a position change of the moving object obtained from autonomous navigation;
- correcting, based on presence probability information which is information on each of a plurality of regions and indicates a higher probability as a presence frequency of the moving object is higher, the estimated position of the moving object so that the moving object is present at a position with a high probability;
- updating the presence probability information based on at least one of the estimated position of the moving object and an action of the moving object, wherein
- the estimated position of the moving object is corrected based on the updated presence probability information,
- in a case of updating the presence probability information based on the estimated position of the moving object, the presence probability information is updated by increasing the probability indicated as the presence probability information corresponding to the estimated position of the moving object, and
- the presence probability information is updated by calculating a path on which the moving object passes from the position of the moving object estimated during an arbitrary period and ascending the presence probability information corresponding to a position at which the moving object is present on the calculated path.

6. A computer program product comprising a non-transitory computer-readable medium containing a position detection program, the program causing a computer to perform:
- estimating a position of a moving object based on an absolute position of the moving object and a position change of the moving object obtained from autonomous navigation;
- correcting, based on presence probability information which is information on each of a plurality of regions and indicates a higher probability as a presence frequency of the moving object is higher, the estimated position of the moving object so that the moving object is present at a position with a high probability;
- updating the presence probability information based on at least one of the estimated position of the moving object and an action of the moving object, wherein
- the estimated position of the moving object is corrected based on the updated presence probability information,
- in a case of updating the presence probability information based on the estimated position of the moving object, the presence probability information is updated by increasing the probability indicated as the presence probability information corresponding to the estimated position of the moving object, and
- the presence probability information is updated by calculating a path on which the moving object passes from the position of the moving object estimated during an arbitrary period and ascending the presence probability information corresponding to a position at which the moving object is present on the calculated path.

* * * * *